(No Model.)

12 Sheets—Sheet 3.

G. F. McCOMBS.
WRAPPING MACHINE.

No. 466,120.

Patented Dec. 29, 1891.

WITNESSES.
C. M. Clarke
Darwin S. Wolcott

INVENTOR.
Geo. F. McCombs
by George H. Christy
Atty (No Model.) 12 Sheets—Sheet 6.

G. F. McCOMBS.
WRAPPING MACHINE.

No. 466,120. Patented Dec. 29, 1891.

WITNESSES. INVENTOR.

(No Model.) 12 Sheets—Sheet 7.

G. F. McCOMBS.
WRAPPING MACHINE.

No. 466,120. Patented Dec. 29, 1891.

WITNESSES. INVENTOR.

(No Model.) 12 Sheets—Sheet 8.

G. F. McCOMBS.
WRAPPING MACHINE.

No. 466,120. Patented Dec. 29, 1891.

WITNESSES
O. M. Clarke
Darwin S. Wolcott

INVENTOR.
Geo. F. McCombs,
by George H. Christy
Atto (No Model.)  12 Sheets—Sheet 9.

G. F. McCOMBS.
WRAPPING MACHINE.

No. 466,120.  Patented Dec. 29, 1891.

WITNESSES.
O. M. Clarke
Danim L. Wolcott

INVENTOR.
Geo. F. McCombs,
by George H. Christy
Atty (No Model.) 12 Sheets—Sheet 10.
G. F. McCOMBS.
WRAPPING MACHINE.
No. 466,120. Patented Dec. 29, 1891.
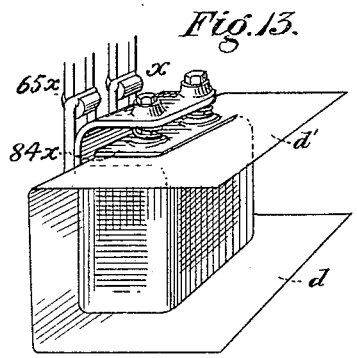
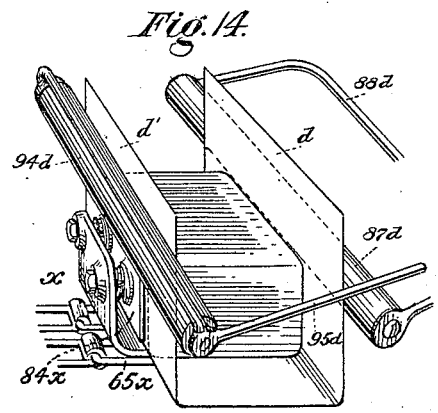
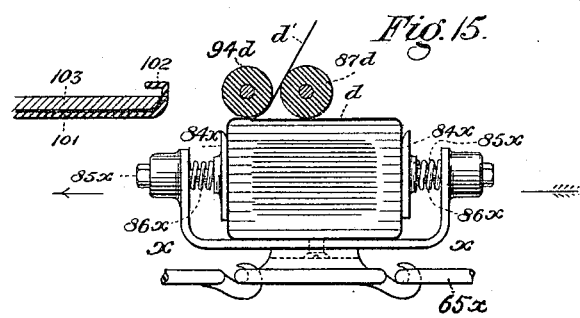
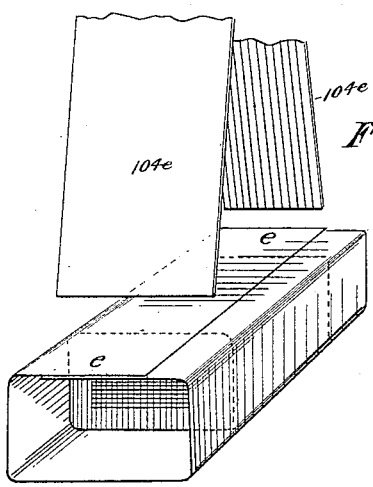
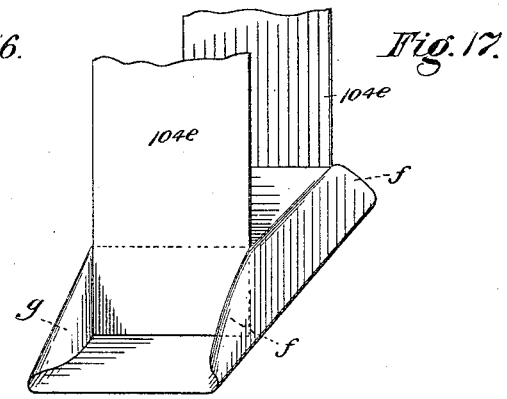
WITNESSES.
O. M. Clarke
Darwin S. Wolcott
INVENTOR.
Geo. F. McCombs,
by George H. Christy
Atty.

(No Model.)  12 Sheets—Sheet 11.

G. F. McCOMBS.
WRAPPING MACHINE.

No. 466,120.  Patented Dec. 29, 1891.

WITNESSES.  INVENTOR.

(No Model.) 12 Sheets—Sheet 12.
G. F. McCOMBS.
WRAPPING MACHINE.
No. 466,120. Patented Dec. 29, 1891.
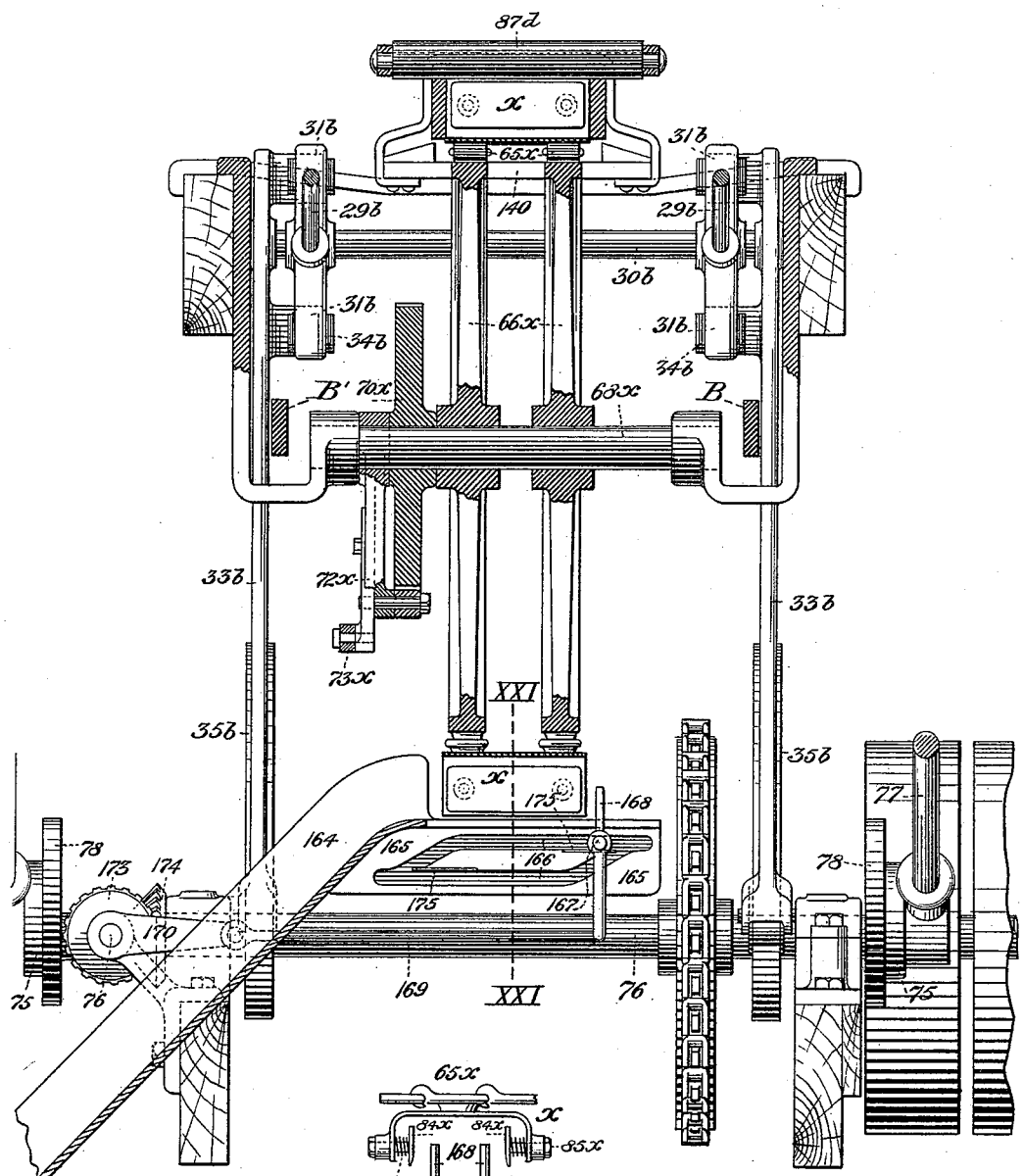
WITNESSES.
INVENTOR.

UNITED STATES PATENT OFFICE.

GEORGE F. McCOMBS, OF ALLEGHENY, PENNSYLVANIA.

WRAPPING-MACHINE.

SPECIFICATION forming part of Letters Patent No. 466,120, dated December 29, 1891.

Application filed July 18, 1889. Serial No. 317,862. (No model.)

*To all whom it may concern:*

Be it known that I, GEORGE F. McCOMBS, a citizen of the United States, residing at Allegheny, in the county of Allegheny and State of Pennsylvania, have invented or discovered certain new and useful Improvements in Wrapping-Machines, of which improvement the following is a specification.

The invention described herein relates to machines for supplying wrappers to cubical packages, such as boxes, cakes of soap, and other analogous articles, and has for its object such a construction and relative arrangement of the several mechanical devices that each step or operation shall be effected in orderly succession and progression upon each package, thus providing a continuous uninterrupted operation of the machine.

In general terms the invention consists in the construction and combination of mechanical devices and elements, all as more fully hereinafter described and claimed.

Figure 1:
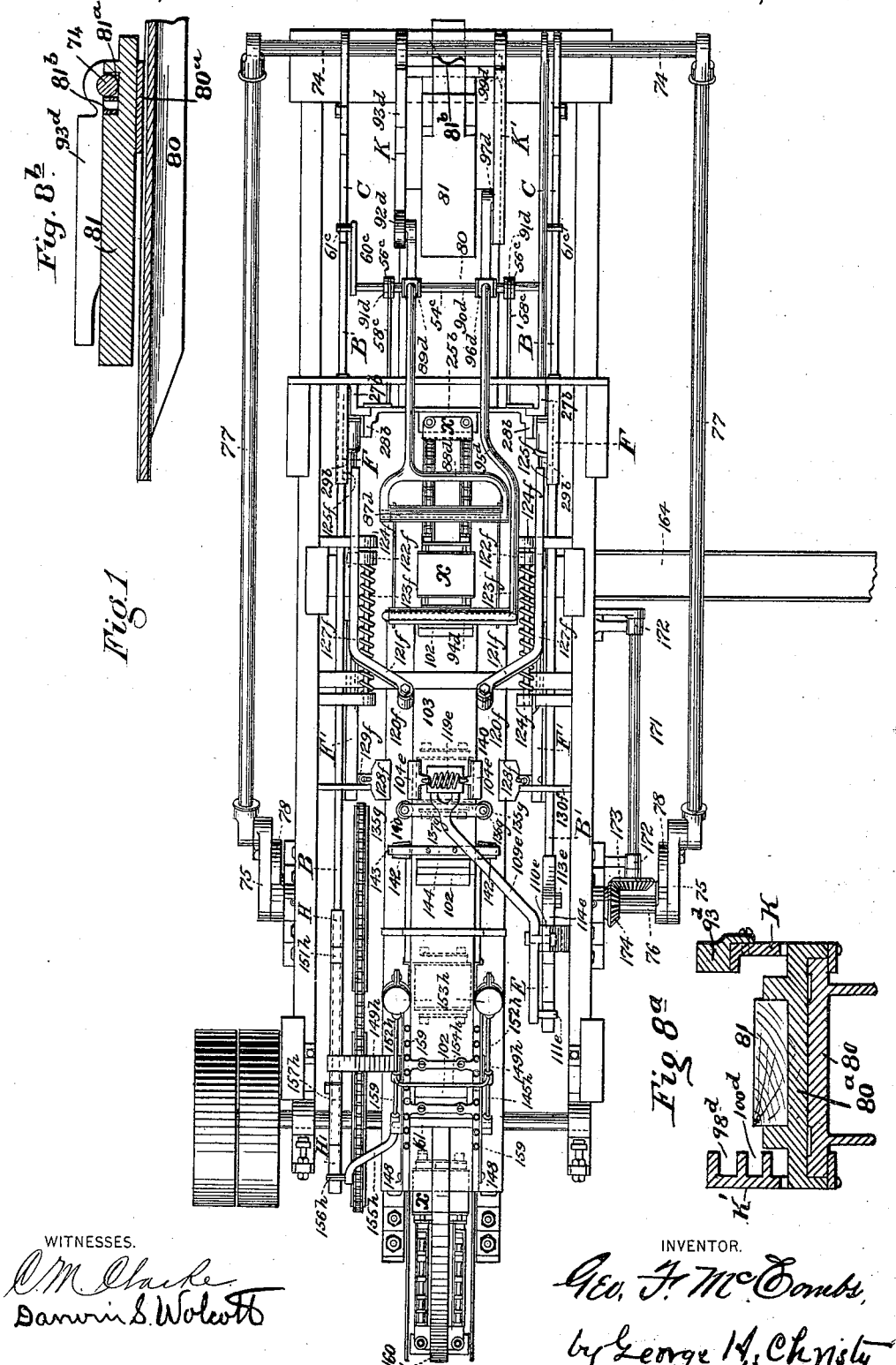
Figure 2:
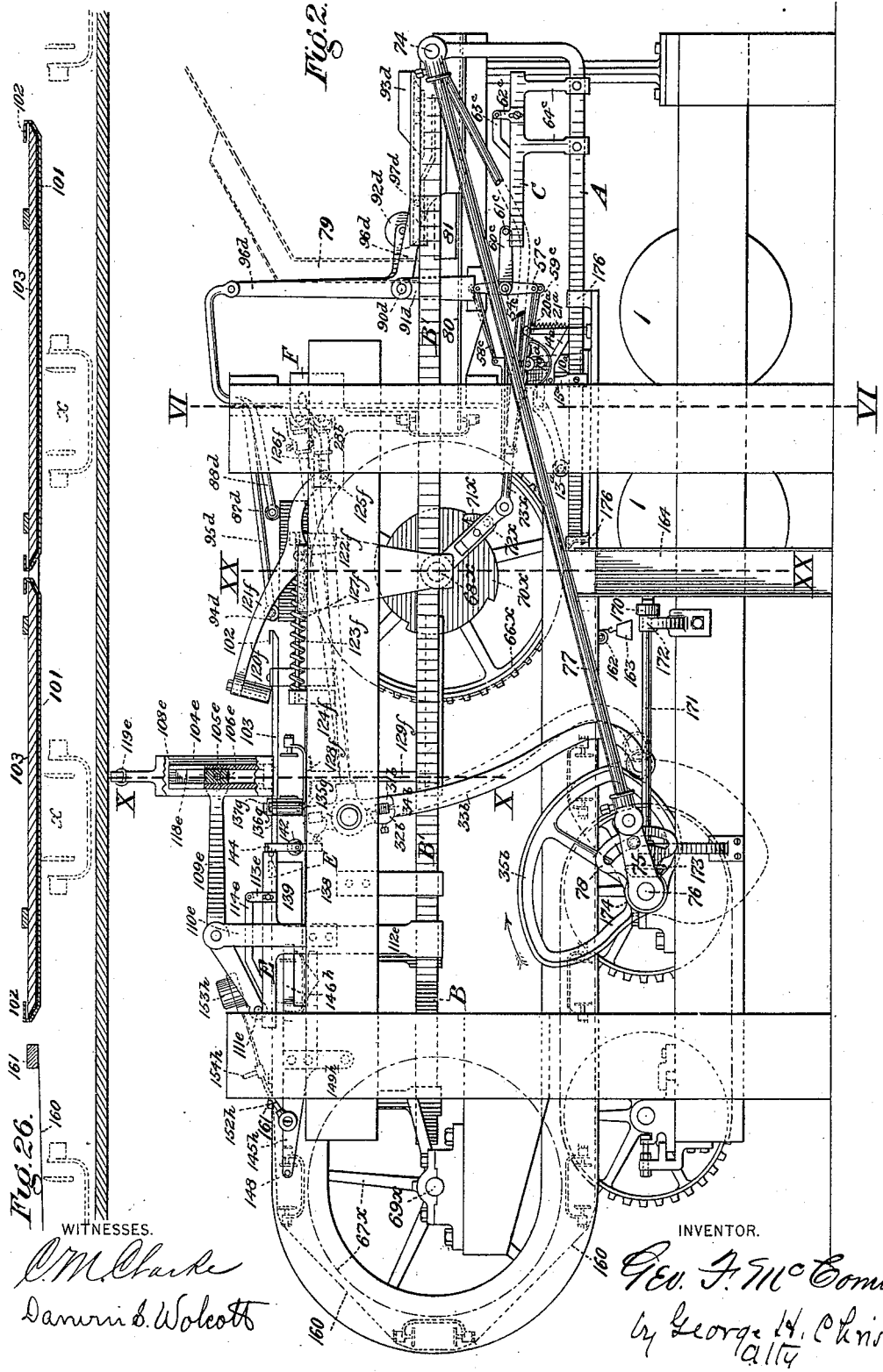
Figure 3:
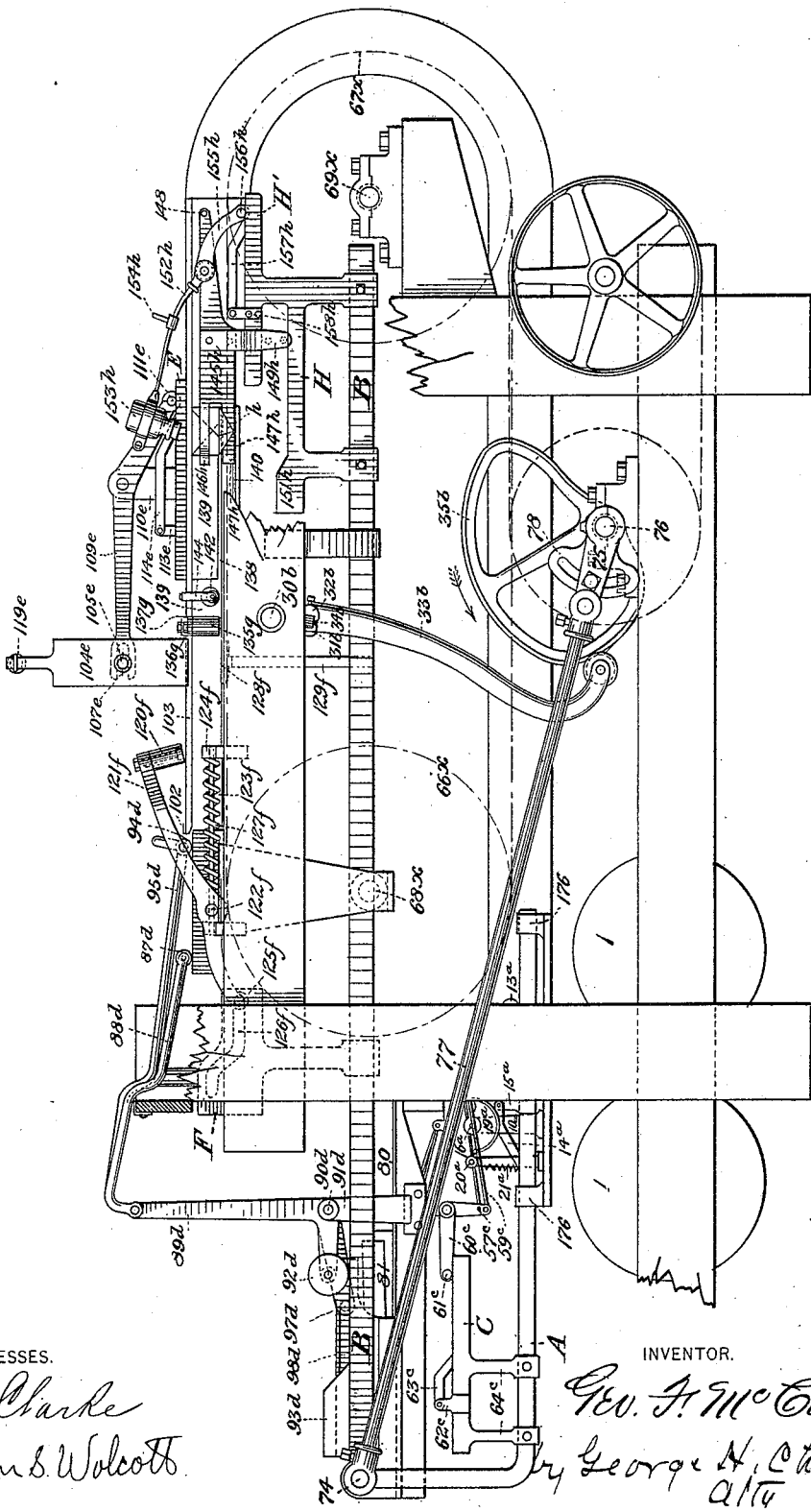
Figure 4:
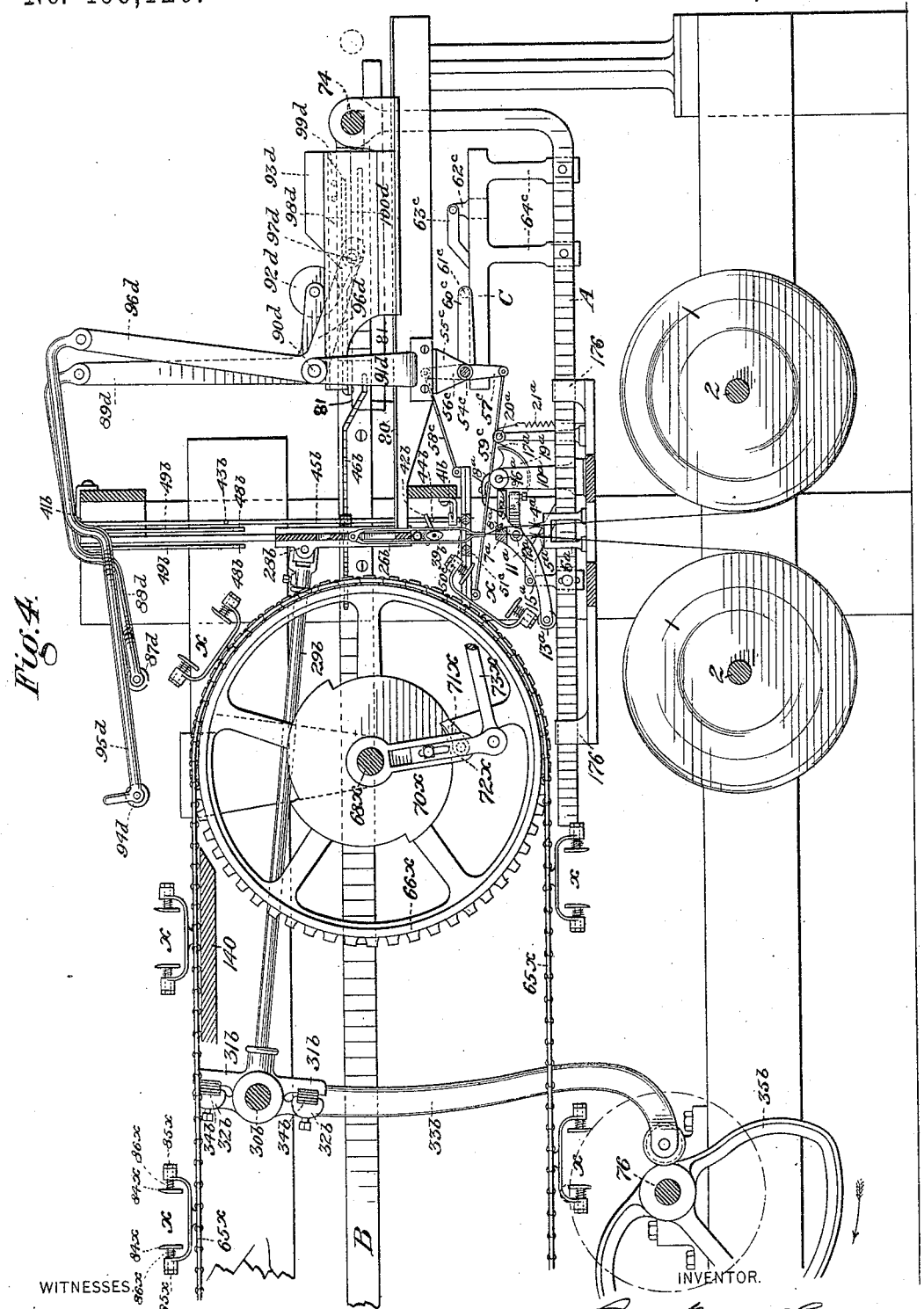
Figure 5:
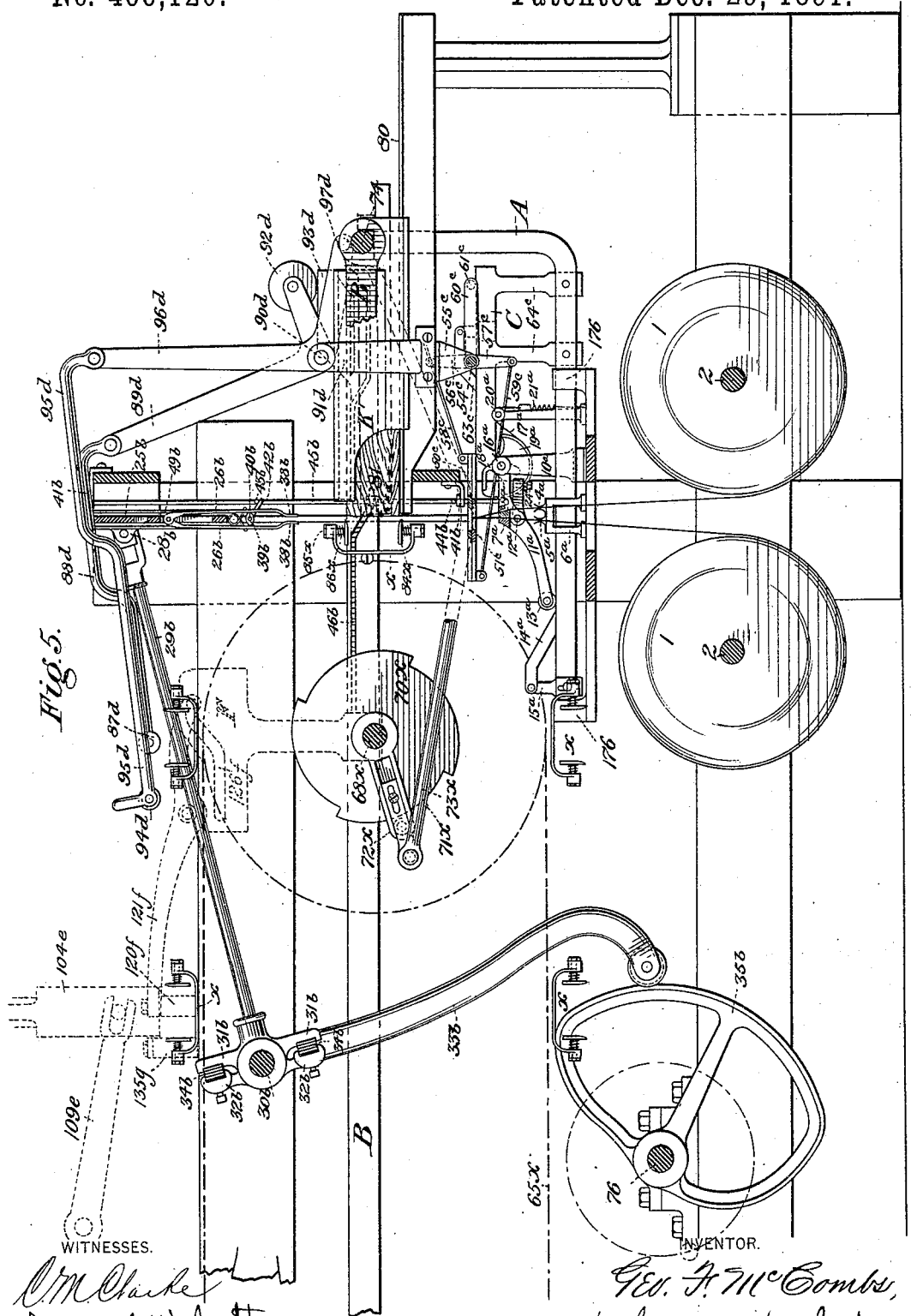
Figure 6:
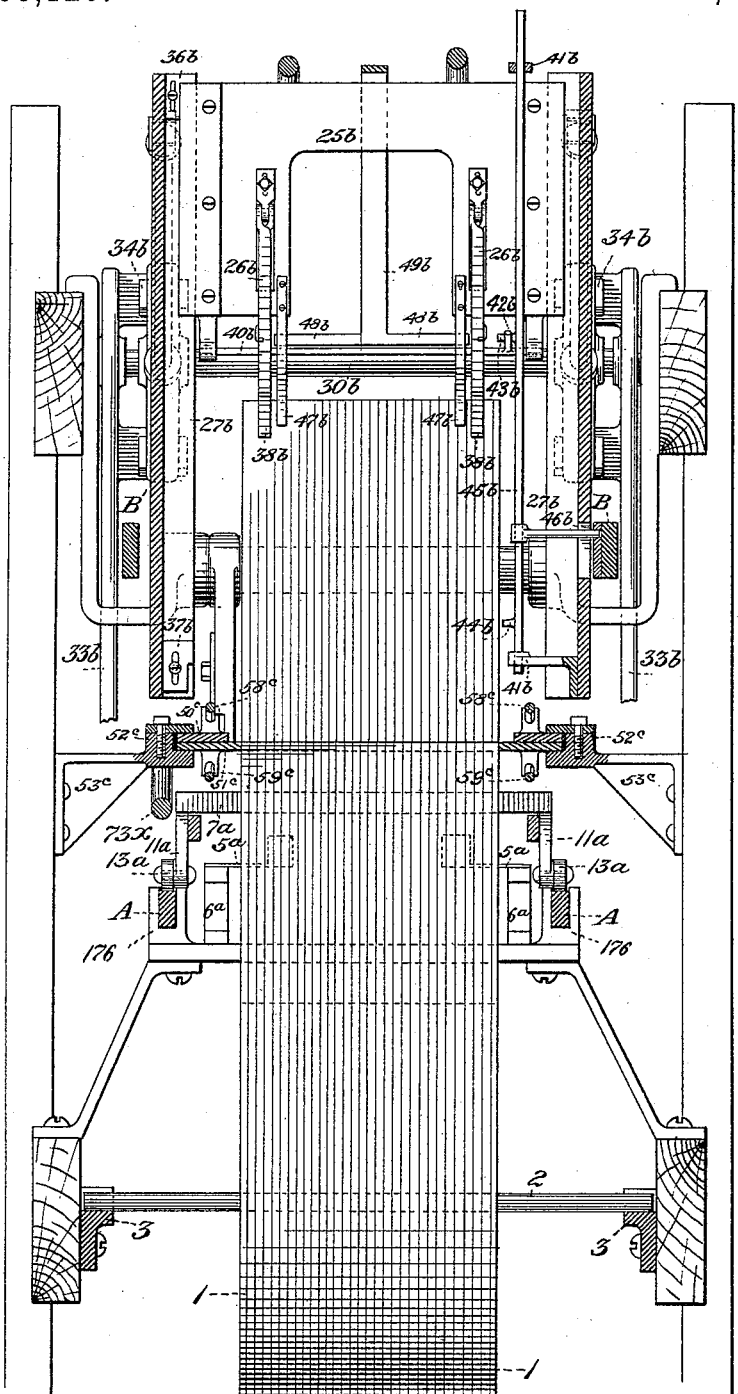
Figure 7:
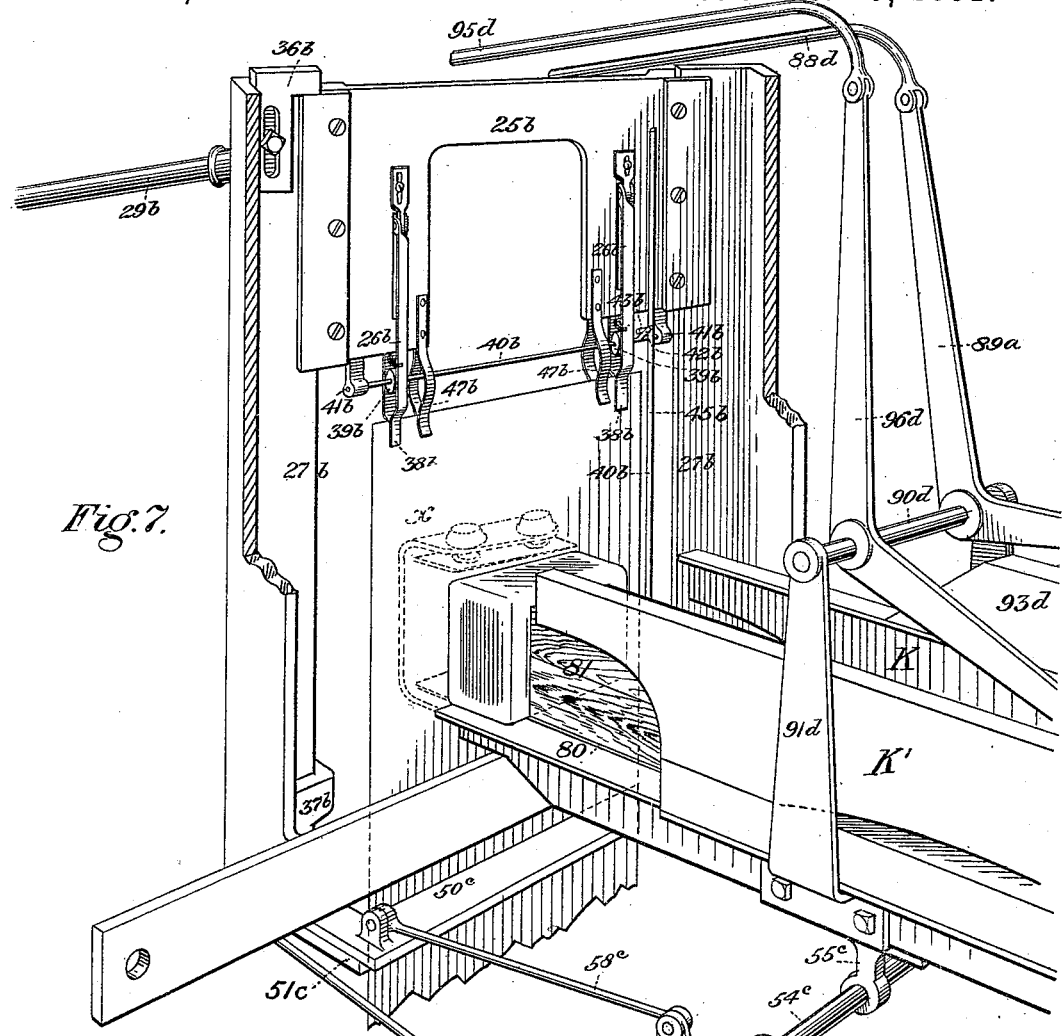
Figure 8:
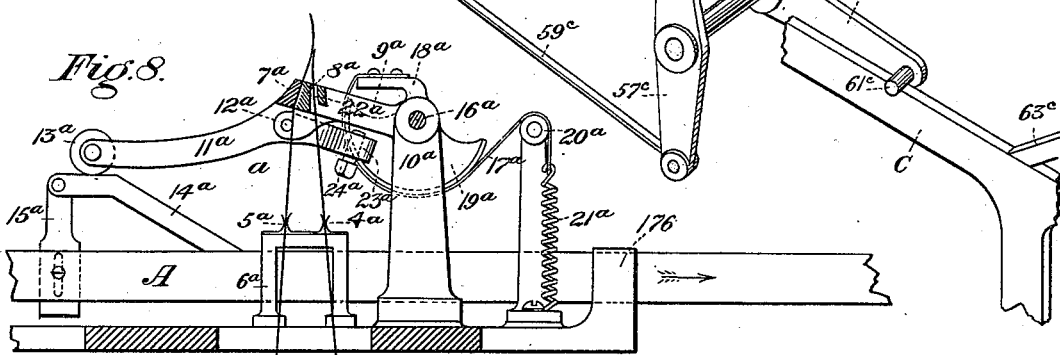
Figure 9:
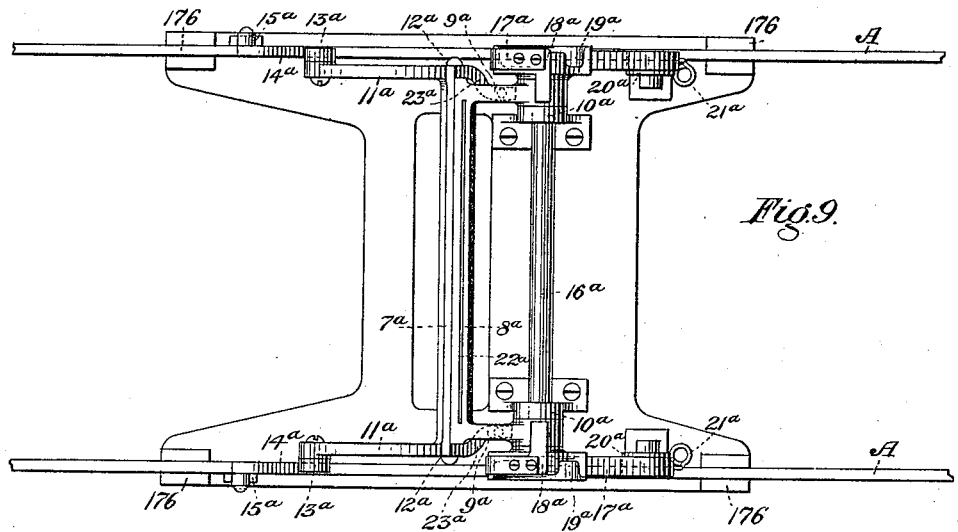
Figure 10:
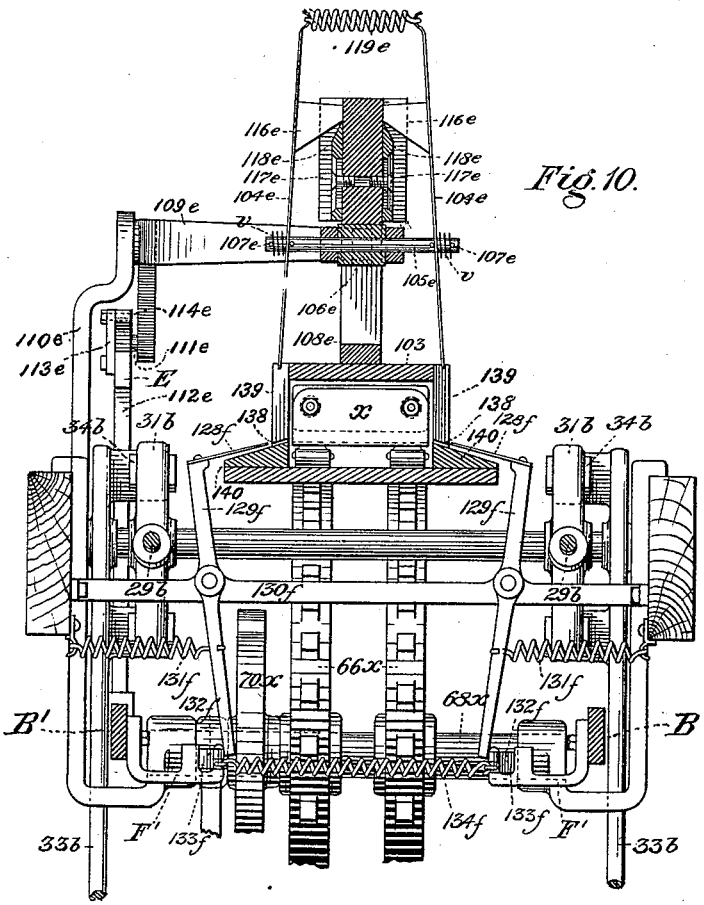
Figures 11, 12:
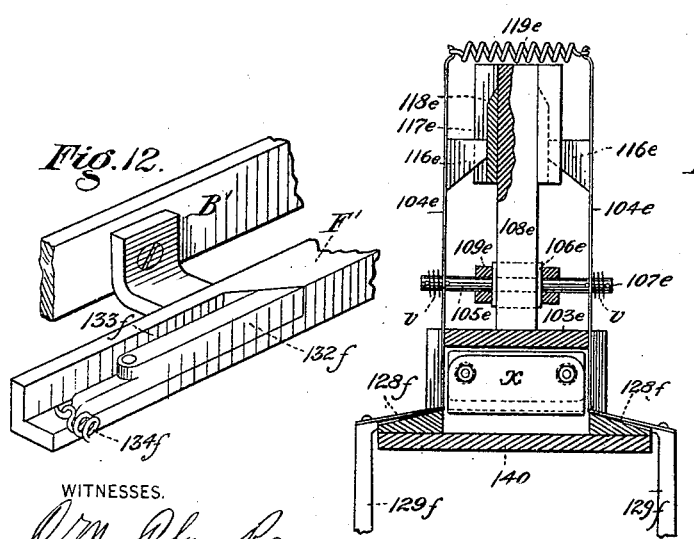
Figure 18:
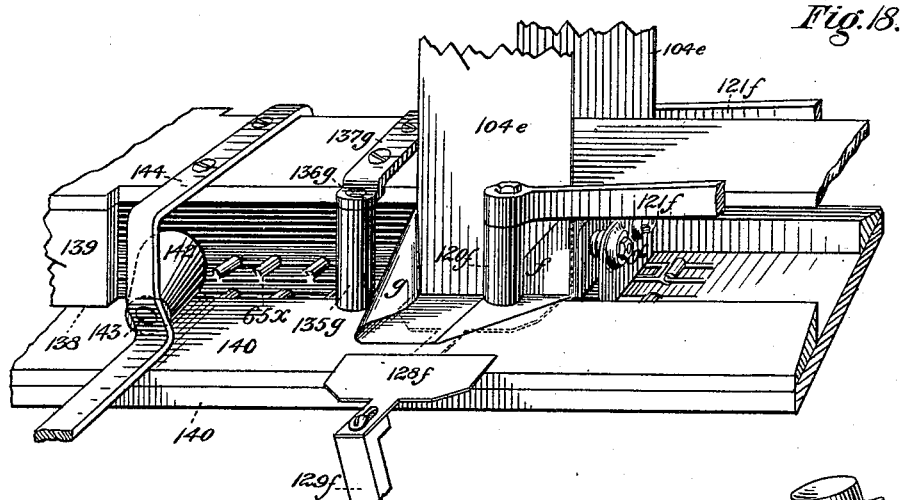
Figure 19:
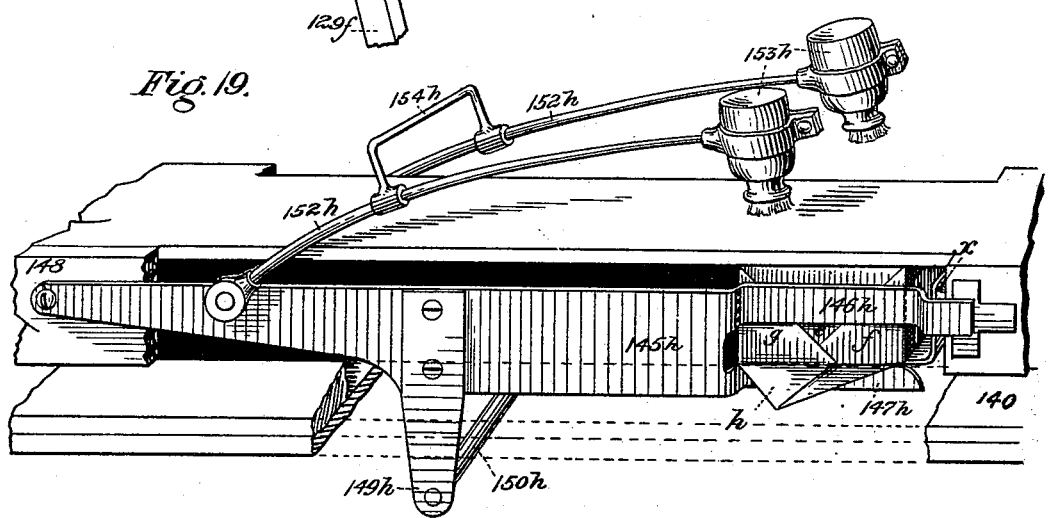
Figure 27:
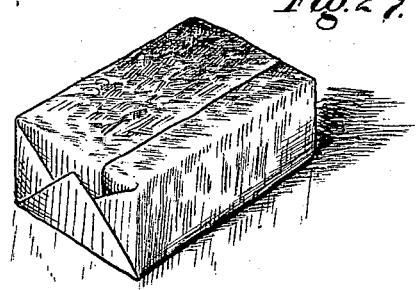

In the accompanying drawings, forming a part of this specification, Figure 1, Sheet 1, is a top plan view of a machine constructed in accordance with my invention. Fig. 2, Sheet 2, is a left side elevation of the same. Fig. 3, Sheet 3, is a similar view of the opposite side of the machine. Fig. 4, Sheet 4, is an enlarged sectional view of the front portion of the machine. Fig. 5, Sheet 5, is a similar view showing the mechanism in operative position. Fig. 6, Sheet 6, is a sectional view on the line VI, Fig. 2. Fig. 7, Sheet 7, is a perspective view of a portion of the front end of the machine. Fig. 8, Sheet 7, is a partial sectional view of the lifting device. Fig. 8$^a$ is a sectional view, on an enlarged scale, transverse of the plunger and its supporting-bed. Fig. 8$^b$ is a sectional view longitudinally of the plunger and its supporting and operating connections. Fig. 9, Sheet 12, is a top plan view of the lifting mechanism. Fig. 10, Sheet 8, is an enlarged sectional view on the line X X, Fig. 2. Fig. 11, Sheet 8, is a similar view showing the same mechanism in a different position. Fig. 12, Sheet 8, is a detail view in perspective of the cam-bars for operating the retaining-blades. Figs. 13, 14, 15, 16, and 17, Sheet 9, are views illustrating different steps in the wrapping operation. Figs. 18 and 19, Sheet 10, are perspective views illustrating the final steps in the wrapping operation. Fig. 20, Sheet 11, is a sectional view on the line XX XX, Fig. 2, illustrating the discharge mechanism; Fig. 21, Sheet 11, is a sectional detail on the line XXI of Fig. 20. Figs. 22 and 23, Sheet 12, are sectional views of the supporting-grippers. Fig. 24, Sheet 12, is a sectional plan showing the retaining and iron rolls at the rear end of the machine. Fig. 25, Sheet 12, is a perspective of one of the cam-plates for operating one of the folding arms. Fig. 26, Sheet 2, is an enlarged vertical section of part of the housing having the retaining-plates connected thereto. Fig. 27, Sheet 10, is a perspective of the finished package.

In describing my invention the mechanism or mechanisms involved in effecting each of the several steps will be designated by a separate letter—as, for example, the mechanism for arranging the paper preparatory to its feed will be designated collectively by $a$, the mechanism for cutting the paper by $c$, the mechanism for feeding and holding the paper by $b$, the boxes or molds and connections by $x$, the mechanism involved in effecting the horizontal fold by $d$, the mechanisms for effecting the tucking and first and second end folds and for retaining the tuck and first end folds by $e$, $f$, and $g$, respectively, the pasting mechanism and the final or vertical folder and their connections by $h$.

The rolls of paper 1, from which the sheets for wrapping the package are drawn, are mounted loosely upon shafts 2, supported at their ends in sockets 3, attached to the frame of the machine, as shown in Fig. 6. The ends of the paper are passed up through holding-springs 4$^a$ and 5$^a$, attached to a bracket 6$^a$, secured to the main frame. These springs bear with sufficient tension upon the paper to prevent any backward movement thereof and to support the end of the inside sheet in proper position to be grasped by the feed-grippers, as will be hereinafter described.

Above the holding-springs I arrange, as shown in Figs. 2, 4, 5, and 6, the mechanism for lifting the end of the outside paper a little above the inside paper, so that the latter will not show on the wrapped package. This mechanism consists of the clamping-bars 7$^a$ and 8$^a$, (see Figs. 8 and 9,) the latter being provided with arms 9$^a$, attached at their outer ends to a bar 16ª, mounted in the standards 10ª, projecting up from the main frame, and the former with tail-pieces 11ª, pivoted near their point of junction with the bar 7ª to ears 12ª on the arms 9ª. On the ends of the tail-pieces 11ª are preferably mounted friction-rollers 13ª, adapted to engage lifting-cams consisting of angular toes 14ª, pivoted at their upper ends to standards 15ª, adjustably attached to the reciprocating bars A, whose operation will be hereinafter described. Friction-bands 17ª, connected to lugs 18ª, projecting up from the standards 10ª, are passed around semicircular disks 19ª, secured to bar 16ª, to which the arms 9ª are secured and around guide-pulley 20ª, and are held in contact with the edges of said disks by springs 21ª. The outer paper passes up between the clamping-bars 7ª and 8ª and the inner paper through a slot 22ª in the bar 8ª, as shown in Figs. 8 and 9. As the bar A moves in the direction of the arrow in Fig. 8 the toes 14ª engage the ends of the tail-pieces 11ª, thereby first moving the bar 7ª toward the bar 8ª, clamping the paper and then raising both bars and the paper held between them. As the inner paper passes freely through the slot 22ª it will not be affected by the movement of the lifting mechanism, and the end of the outer paper will project up beyond the end of the inner paper by an amount regulated by the lift of the toes 14ª, which can be adjusted as hereinbefore stated. It will be observed by reference to Fig. 8 that in addition to thus lifting the outer paper the clamping-bars throw the end of the outer paper toward and against the inner paper and hold it in this position, so that both papers may be readily grasped by the grippers of the feed mechanism, as will be hereinafter described.

The clamping-bars are held in their upper position by the horizontal portion of the toes 14ª, said portions being made sufficiently long to afford opportunity for the operation of the feed-grippers. As the ends of the tail-pieces pass beyond the end of the toes 14ª, they drop down onto the reciprocating bar A, carrying with them the clamping-bars 7ª and 8ª; but the movement of the bar 8ª is partially arrested by the brake mechanism, consisting of the disks 19ª and bands 17ª, as hereinbefore described, so that the tail-pieces and the bar 7ª will have slight movement independent of the bar 8ª, thereby separating the clamping-bars and permitting of their downward movement clear of the paper.

In order to insure the downward movement of the bar 8ª, the tail-pieces are provided with extensions 23ª on their front ends, and through these extensions pass the set-screws 24ª, whose ends engage the arms 9ª as soon as the tail-pieces and bar 7ª have moved sufficiently far to release the paper, as hereinbefore described. The tension of the band 17ª is so adjusted that the friction exerted thereby will counterbalance the weight of the bar 8ª and its arms, but not the added weight of the bar 7ª and its tail-pieces. The toes 14ª being pivoted to the standards 15ª, they will ride over the friction-rollers on the ends of the tail-pieces on the return movement of the bar A. The outer paper having been lifted, as hereinbefore described, the cross-head 25ᵇ is moved down, so that the spring-grippers 26ᵇ on said cross-head may grip both papers. This cross-head is mounted on vertical ways 27ᵇ, secured to the frame of the machine, and on the rear side of the cross-head are fixed lugs 28ᵇ, which engage the forked ends of the arms 29ᵇ of the rock-shaft 30ᵇ. The sockets forming the rear ends of the arms 29ᵇ are provided with diametrically-arranged lugs 31ᵇ, with which lateral projections 32ᵇ on the sockets forming the upper ends of the levers 33ᵇ engage, suitable rubber cushions 34ᵇ being interposed between the projections 32ᵇ and lugs 31ᵇ, as shown in Figs. 2, 3, 4, and 5. The upper ends of the levers 33ᵇ are pivoted on the rock-shaft 30ᵇ, and its lower end is held in engagement with the cams 35ᵇ by the weight of the cross-head. The cross-head is checked at the upper and lower limits of its movements by adjustable stops 36ᵇ and 37ᵇ, as shown in Fig. 6, and any shock or jar incident to the contact of the cross-head is taken up by the rubber cushions 34ᵇ. The lifting-grippers 26ᵇ are so attached, as shown in Fig. 7, as to permit of their vertical adjustment, and are so constructed that their lips 38ᵇ are held together with considerable force. The lips 38ᵇ are moved apart to permit the paper to escape when the cross-head reaches the upper limit of its movement, and are held apart until the cross-head again reaches the lower limit of its movement by means of oval-shaped buttons 39ᵇ, arranged between the jaws of the grippers, as shown in Fig. 7, and rotated by the rod 40ᵇ, on which they are fixed. This rod 40ᵇ is mounted in bearings 41ᵇ on the cross-head, and is provided with a pin 42ᵇ, adapted to engage pins 43ᵇ and 44ᵇ, arranged on the vertical rod 45ᵇ a distance apart equal to the movement of the cross-head. The vertical rod is moved up and down at proper intervals by means of a cam-groove 46ᵇ, formed in the side of one of the reciprocating bars B, as shown in Figs. 4 and 5. As hereinbefore stated, the lips 38ᵇ are open during the downward movement of the cross-head, so that as said cross-head reaches the lower limit of its movement the ends of the papers will have entered between said lips, which are then permitted to close upon the paper by rotating the buttons 39ᵇ, as hereinbefore stated. The paper having been grasped by the lips of the lifting-grippers the mechanism *a* for raising the outer paper releases its hold and the cross-head moves up, carrying with it the paper. It is desirable, in order to draw the paper from the rolls, that the grippers should be roughened on their inner faces and should take such a firm hold thereupon that the paper would be liable to be torn if pulled therefrom in the subsequent operations. Hence supporting-grippers 47$^b$, adapted to take a comparatively light hold upon the paper are attached to the cross-head alongside of the grippers 26$^b$. The holding-grippers 47$^b$ are constructed so that their holding-lips are normally separated, and are closed upon the paper as the cross-head reaches the upper limit of its movement and before the grippers 26$^b$ are forced apart by means of rods 48$^b$, projecting laterally from brackets 49$^b$, attached to top brace of the vertical ways 27$^b$, as shown in Figs. 4, 22, and 23. These rods 48$^b$ are so arranged as to bear upon the grippers 47$^b$ and force their lips against the paper. The grippers 47$^b$ are held in their closed position until the cross-head moves down again, when the grippers pass from between their closing-rods 48$^b$ and assume an open position. During their vertical movements the grippers 26$^b$ pass, as shown in Figs. 4, 5, and 6, between the blades 50$^c$ and 51$^c$, which are supported at their ends by guideways 52$^c$, secured to brackets 53$^c$, bolted, as shown, to the frame of the machine. Upon a shaft 54$^c$, arranged parallel with the blades and mounted in bearings formed on the ends of hangers 55$^c$, depending from the main frame, are secured diametrically-arranged arms 56$^c$ and 57$^c$, two at each end of the shaft. The arms 56$^c$, projecting upwardly from the shaft, are connected by rods 58$^c$ to the cutter or blade 50$^c$, and the arms 57$^c$ are connected by rods 59$^c$ to the other blade 51$^c$. The shaft 54$^c$ is also provided with a rearwardly-projecting arm 60$^c$, having a laterally-projecting finger 61$^c$, which rests upon the reciprocating bar C, provided with a vertically-adjustable post 62$^c$, having the angular toe 63$^c$ pivoted to its upper end. The bar C is provided with standards 64$^c$, whereby it is adjustably attached to one of the reciprocating bars A. As the bar C is moved to the left the finger 61$^c$ will ride up the toe 63$^c$, thereby partially rotating the shaft 54$^c$ and moving the cutters or blades toward each other, and as the finger drops off the rear end of the toe the arm 60$^c$ will drop down, returning the blades to normal open position. During the movement of the bar C to the right in Figs. 4 and 5 the toe will ride over the finger without shifting the blades.

In order to obtain a shear action, the edges of the blades may be inclined to each other and moved in straight lines; but I prefer, as giving more room between the blades, to make the cutting-edges parallel and then imparting an angular movement to the blades. This movement can be effected by making the arms 56$^c$ and 57$^c$ at one end of the shaft a little longer than at the other end, as shown in Fig. 2, thereby effecting a little quicker movement to the corresponding ends of the blades; or, if desired, the cutting-edge of one blade may be inclined and the edge of the other blade straight, one end of the blade having the straight edge being moved, as above stated, a little faster than the opposite end. As the cross-head 25$^c$ is moved up, as before described, it pulls the paper in front of one of the boxes or molds $x$, a series of which is secured at suitable intervals to a sprocket-chain 65$^x$. This chain is arranged around sprocket-wheels 66$^x$ and 67$^x$, secured to shafts 68$^x$ and 69$^x$, mounted in suitable bearings at opposite ends of the frame of the machine. On the shaft 68$^x$ is keyed a ratchet-wheel 70$^x$, with which a pawl 71$^x$, pivoted to the arm 72$^x$, engages. This arm is loosely mounted on the shaft 68$^x$ and has its free end connected by a pitman 73$^x$ to a rod 74, arranged transversely of the machine. This rod 74 is termed, for convenience, the "transmitting-rod," for the reason that all the mechanisms of the machine, except the cross-head 25$^c$ and the discharge mechanism, are operated either directly or indirectly by said rod, which is reciprocated by the crank 75 on the power-shaft 76, through the pitman 77. For convenience in adjusting the crank relative to the cams 35$^b$, said crank is loosely mounted in the shaft 76, but is connected by a bolt to a slotted segment 78, keyed to the shaft 76, as shown in Fig. 2. As soon as the paper has been raised and cut off, as hereinbefore described, at which time one of the molds $x$ will, in the orderly operation of the machine, have been moved into the position shown in Figs. 5 and 7 behind the severed section of paper, the package or like cube material—e. g., a cake of soap—will have been deposited from the vertical chute 79 onto the bed 80 in front of the plunger 81. This plunger is arranged between the reciprocating side plates K K' and is connected to the transmitting-bar 74 by means of a groove 81$^a$, formed transverse of the plunger for the reception of the bar 74, as shown in Fig. 8$^b$, said plunger being supported by a plate 80$^a$, connecting the side plates K K' and passing over the stationary bed 80. In order to allow of a slight yielding movement of the plunger during its forward movement, a spring 81$^b$ is arranged between the bar 74 and the front wall of the groove 81$^a$. The cake of soap is pushed by the plunger into the box or mold $x$, the paper being pressed in ahead of the soap, as shown in Fig. 13, and in that way folded around three sides of the cake.

In order to fold or wrap the paper smoothly around the cake, the mold or box, which is open at its ends and is made wider than the cake, is provided on its opposite sides with presser-plates 84$^x$, supported by pins 85$^x$, passing through guide-openings in the sides of the box and normally held by springs 86$^x$, surrounding the guide-pins and interposed between the plates and the side walls of the box a distance apart slightly less than the width of the cake, the outer edges of the plates being beveled to permit of the entrance of the cake into the box. As the cake is forced into the box, these plates will exert such a tension upon the paper as to cause it to fold smoothly around three sides of the cake, the upper end of the paper being drawn by the inward movement of the cake from the supporting-grippers $47^b$. The guide-pins around which the spring $86^x$ are placed are provided on their outer ends with nuts, whereby they may be drawn out, and with them the plates $84^x$, thereby increasing the lateral dimensions of the boxes or molds. After the cake has been forced into the box or mold $x$ and the paper folded, as before stated, the plunger is withdrawn, and the sprocket-wheel $66^x$ is rotated so as to move the box or mold into the position shown in Fig. 5, and another box or mold $x'$ is brought into line with the plunger 81 for the reception of another cake. As shown in Figs. 13 and 14, the ends of the paper project upwardly and the sides thereof project outwardly beyond the ends of the cake and of the box or mold, the latter being shorter than the cake.

The next operation is to fold the ends $d$ $d'$ down upon the exposed side of the cake, the end $d$ being first folded, as the edges of both papers are in line with each other at said end, and hence when folded over the cake the end of the inside paper will project a little beyond the outside of the outer sheet. The folding down of the end $d$ is effected by the roll $87^d$, provided at its ends with journal-pins which are mounted in suitable bearings on the forked ends of the bar $88^d$, connected at its opposite end to one end of the bell-crank lever $89^d$, loosely mounted on the shaft $90^d$, which is supported at its ends by posts $91^d$, secured to the frame-work of the machine. The opposite end of this lever is provided with a friction-roller $92^d$, resting upon the reciprocating plate K, which is provided with a cam projection $93^d$. As the plate K moves forward to the left in Figs. 2, 3, 4, and 5, the cam projection engages the roller $92^d$ and oscillates the lever $89^d$ and causes the roll $87^d$ to pass over the cake, folding the end $d$ of the paper down, as shown in Fig. 15. While the roll $87^d$ is at the left-hand limit of its movement, as above described, the roll $94^d$ is caused to move to the right, thereby catching the end $d'$ of the paper between it and the roll $87^d$. The roll $94^d$ is mounted in the same manner as the roll $87^d$, in a fork on the end of a bar $95^d$, which is connected at its opposite end to the end of a bell-crank lever $96^d$, loosely mounted on the shaft $90^d$. The opposite end of this lever is provided with a pin $97^d$, projecting laterally into a groove $98^d$, formed in the side of the plate K'. As shown in Fig. 25, the groove $98^d$ is made straight, and at its rear end is provided with a spring-switch $99^d$, whereby the pin $97^d$ may be thrown down into branch groove $100^d$, which for a portion of its length is parallel with the groove $98^d$ and inclines upward and merges into the groove $98^d$. During the movement of the plate K' to the left and while the roll $87^d$ is operating the bell-crank lever $96^d$ will not be moved, the pin $97^d$ being in the groove $98^d$; but as the plate $K^d$ reaches the left-hand limit of its movement the pin $97^d$ is thrown down, thereby bringing the roll $94^d$ up to or nearly to the roll $87^d$, as before stated. The rolls $87^d$ and $94^d$ are held in this position during a part of the return traverse of the bars B B' by the straight portions of the cam projection $93^d$ and groove $100^d$. Hence as the sprocket-wheels and the boxes are shifted during this return movement of the bars B B' to the right, said bars and wheels being operated by the transmitting-rod 74, the cake and its wrapper will be moved to the left and under the retaining-plate 101, as shown in Fig. 15. During this movement of the box and its contained cake the end $d'$ of the paper will be folded down upon the other end, and by the friction exerted by the rolls $87^d$ and $94^d$ will be drawn comparatively tight against the cake. As the end $d'$ passes from under the roll $94^d$, said roll and the roll $87^d$ are returned to normal position, the friction-roller $92^d$ passing down the inclined face of the cam projection $93^d$ and the pin $97^d$ riding up the inclined portion of the groove $100^d$. The pin $97^d$ is prevented from entering the groove $100^d$ during the left movement of the plate K' by the weight of the roll $94^d$ and its carrying-bar $95^d$, which hold said pin against the upper wall of the groove $98^d$ until thrown down by the switch $99^d$. The retaining-plates 101, whose function is to hold the folded ends $d$ $d'$ in position, have their ends turned up to form hooks 102, which engage the housing-plate 103, as shown in Fig. 26, said hooks being so constructed as to permit of the entire weight of the plate to rest upon the cake, but not to drop so far as to prevent the movement of the boxes and mold under it.

The box or mold $x$ having been moved into its third position, as hereinbefore stated, the next operation—i. e., tucking in one side of the shell of paper now surrounding the cake, as shown in Figs. 16 and 17—is effected. The tuckers $104^e$ are thin steel blades of a width equal to or approximately equal to the width of the cake, and are pivotally mounted on a bar $105^e$, mounted in the sliding block $106^e$, the blades being held in position longitudinally of the bar by pins $107^e$, passing through the bar on opposite sides of the tuckers, as shown in Figs. 10 and 11. The block $106^e$ is arranged in a transverse slot in the standard $108^e$, secured on the housing-plate 103, and is operated up and down in said slot by a forked lever $109^e$, engaging the bar $105^e$ on opposite sides of the sliding block. The lever $109^e$ is pivoted on a post $110^e$, bolted to the main frame, and is provided at its free end with a laterally-projecting pin $111^e$, normally resting upon a bar E, adjustably attached by uprights $112^e$ to the reciprocating bar B'. A post $113^e$ is adjustably attached to the bar E, and on the top of said post is pivoted the angular toe $114^e$, adapted when the bar is moved to the left to engage the pin $111^e$, thereby raising the free end of the lever $109^e$, said pin dropping off the end of the angular toe as the motion of the bar E to the left is continued, as shown in Figs. 1, 2, 3, and 10. As the bar returns to the right the toe will ride over the pin and drop to operative position, as shown in Figs. 1, 2, and 3. Lugs 116$^e$ are secured on the inner sides of the tuckers near their upper ends, said tuckers being adapted to enter grooves 117$^e$, formed in the sides of the standard 108$^e$ and engage cam projections 118$^e$, so secured in the bottoms of the groove 117$^e$, as shown in Figs. 10 and 11, as to be capable of vertical adjustment, as hereinafter described. The lugs 116$^e$, by engagement with the grooves 117$^e$, serve to prevent any edgewise movement of the tuckers, and the cam projections 118$^e$ cause the upper ends of tuckers to move outwardly and their lower ends inwardly, as they are moved down by the lever 109$^e$. The lugs 116$^e$ are held in engagement with the cam projections by a spring 119$^e$, connected to the upper ends of the tuckers. From the foregoing it will be readily understood that as the tuckers move down and their lower edges engage the portions $e$ of the wrapper the lower ends are moved inwardly, thereby pressing said portions $e$ of the wrapper with a wiping movement against the ends of the cake and holding it in such position as the tuckers move down, thereby folding said portions smoothly and firmly against the cake.

In order to prevent any straining of the tucker-blades and to insure a more perfect action by them, small springs $v$ are interposed between the outer pins 107$^e$ and the blades, thus permitting of slight outward movements of the blades.

The next and quickly-succeeding step is to turn in the portions $f$ of the wrapper, as shown in Fig. 18, this step being effected while the tuckers are held against the ends of the cake by the horizontal portion of the toe 114$^e$. The turning in of the portions $f$ of the wrapper is effected by rolls 120$^f$, loosely mounted on pins secured in the ends of levers 121$^f$. These levers are not only oscillated on their pivotal supports, but are also reciprocated horizontally, in order that they may effect their functions and be moved away to permit of the operation of other mechanisms. To this end the levers 121$^f$ are pivoted on pins projecting out from sleeves 122$^f$, mounted on square rods 123$^f$, which are supported by posts 124$^f$, projecting up from the main frame, as shown in Figs. 1 and 2. The tails of the levers are provided with laterally-projecting pins 125$^f$, engaging cam-grooves 126$^f$ in the plates F, adjustably attached to the bars B B'. As these plates are moved to the left in Fig. 2 or to the right in Fig. 3 the rolls 120$^f$ are by the action of the cam-grooves thrown down into position to engage the portions $f$ of the wrapper, and as the pins 125$^f$ in the continued movements of the plates engage the ends of the cam-grooves the rolls are carried along and turn the portions $f$ over against the tuckers, as shown in Fig. 18. As the plates F return to the right or normal position the rolls 120$^f$ and their levers are also returned by the springs 127$^f$, interposed between the sleeves 122$^f$ and one of the supporting-posts 124$^f$; but prior to the return of the rolls 120$^f$ to normal position, as above stated, provision is made for retaining the portions $f$ in their folded positions by means of blades 128$^f$, formed of thin pieces of steel of a width approximately equal to the width of the cake. As the rolls 120$^f$ finish their folding operations these retaining-blades, which are adjustably attached to the upper ends of levers 129$^f$, pivoted to the transverse bar 130$^f$, are pushed up against the folded portions $f$, passing under the ends of the rolls 120$^f$ by the springs 131$^f$, connected to the tails of the levers 129$^f$. The blades are held away from the package by latches 132$^f$, pivoted, as shown in Figs. 10 12, in recesses in the bars F', carried by the reciprocating bars B B'. During the forward or left-hand movement of the bars F' the tails of the levers 129$^f$ ride along the outer edges of said bars and latches until the bars F' approach the ends of the forward movements, when the tails of the levers escape beyond the ends of the latches, being moved outwardly by the springs 131$^f$. As the bars F' move back toward normal position the tails of the levers are held in the grooves 133$^f$, formed by the latches and the walls of the recesses in which the latches are arranged. The tails of the levers traverse the grooves until they engage the inclined walls of the grooves, by which tails are forced outwardly, the latches yielding to permit of this movement, and are then returned to normal position by a spring 134$^f$, connected to the rear ends of the latches, as shown in Fig. 10. The outward movements of the tails of the levers move the retaining-blades out away from the packages. As the blades 128$^f$ are pressed in, as above described, to hold the portions $f$ and $e$ of the wrapper in position, the tuckers are raised, the pin of the lever 109$^e$ dropping off the end of the angular toe 114$^e$, thereby raising the tuckers, and the reciprocating bars B, with the cam-plates F, commence their rearward movements, thereby drawing back and raising the rolls 120$^f$ and moving the box or mold $x$ onward toward its fourth position. As the box or mold moves along, the folds previously made being held by the retaining-blades 128$^f$, the portions $g$ of the wrapper are brought into contact with the rolls 135$^g$, which are loosely mounted on pins 136$^g$, depending from the ends of a bar 137$^g$, secured to the housing-plate 103, as shown in Figs. 1, 2, 3, and 18, and are by said rolls turned in against the portions $e$. The triangularly-shaped portions $h$, formed by the folding of the portions $f$ and $g$, pass under the ends of the rolls 135$^g$ and enter slots 138, formed between the side plates 139 and the bed-plate 140, which is longitudinally grooved to permit of the passage of the sprocket-chain, and is provided with outwardly-beveled ledges, on which the triangularly-shaped portions $h$ of the wrapper rest during the subsequent operations. The slots 138 at the ends where the portions $h$ enter are sufficiently wide to permit said portions entering freely, and gradually decrease in width, so as to compact the folds adjacent to the cake, the portions lying against the ends of the cake being retained in position by the side plates 139. As the boxes or molds move along toward the fourth position the triangularly-shaped portions $h$ lying on the beveled ledges are passed under the ironing or compressing rolls 142, which compress and flatten said portions preparatory to the subsequent operations. These conically-shaped rolls 142 are loosely mounted on pins 143, secured to the ends of angularly-shaped strap 144, said strap being secured to the housing-plate 103. The projecting ends of the strap afford sufficient elasticity to permit the rolls to rise in cases of unusual thicknesses of wrapper. As the boxes or molds approach the fourth position the triangularly-shaped portions $h$ enter a slot formed in the forward ends of arms $145^h$, the prongs $146^h$ of said arms passing above the portions $h$ and against the folds $f$ and $g$, the forward ends of said prongs being located at the rear ends of the side plates 139, as shown in Figs. 2, 3, and 19, thereby holding said folds in position. The prongs $147^h$ pass under the portions $h$, so as to be in position for holding said portions up against the ends of the cake. The arms $145^h$ are pivoted at their rear ends to the rear side plates 148, as shown in Figs. 2, 3, and 19, and one of said arms is provided at a suitable point along its length with a lug $149^h$, and the arms connected by a rod $150^h$, so as to insure simultaneous and equal movements thereof. The lug $149^h$ is extended out laterally, as shown in Fig. 1, so as to bring the end of said lug into line with the bar H, adjustably attached to the reciprocating bar B, and provided with a cam projection $151^h$, whereby in the movement of the bars B and H the arms $145^h$ will be raised, thereby folding the triangularly-shaped portions of the wrapper up against the package. Before this folding operation it is desirable to apply glue or paste to the inner surfaces of the portions $h$, in order that they may be held in position. To this end rods $152^h$ are pivoted to the arms $145^h$, and have secured to their free ends automatically-operating paste-applying devices $153^h$, as shown in Figs. 1, 2, 3, and 19. The rods $152^h$ are connected together across the machine by a brace $154^h$, so as to insure the simultaneous movements of the pasting devices $153^h$. One of the rods $152^h$ is provided with a rearwardly and laterally-projecting tail $155^h$, having a pin $156^h$ in line with and resting upon the bar H′, preferably formed integral with the bar H, as shown in Figs. 1 and 3. As the bar H′ moves toward the rear of the machine, the angular toe $157^h$, pivoted to the end of the post $158^h$, which is adjustly attached to the bar H′, engages and raises the tail $155^h$, thereby depressing the pasting devices down onto the portions $h$ of the wrapper. The horizontal portion of the toe $157^h$ is made sufficiently long to allow of the proper application of the paste, and said toe is so located on the bar H′ that the pin $156^h$ will drop off said toe, thereby raising the pasting devices a little before the cam projection $151^h$ engages the lug $149^h$ and raises the arms $145^h$ for the purpose of folding the portions $h$ up against the ends of the cake. This folding operation is effected just before the bars B reach the rearward limits of their movements, and consequently the boxes or molds are moved along, the sprocket-wheels being operated during the return movements of the bars B immediately after the portions $h$ of the wrapper have been turned, and by this movement of the boxes or molds the packages contained therein are carried between a series of vertical rolls 159, arranged to bear against the ends of packages and hold the portions $h$ in their folded positions, as shown in Figs. 1 and 24. A sufficient number of these presssing-rolls 159 are so arranged along the line of movement of the boxes as to afford an opportunity for such a hardening of the paste that the folds will be held in position thereby.

In order to retain the packages thus formed within the boxes or molds until they reach the point of discharge, a ribbon 160 is secured to a cross-bar 161 at the rear end of the pressing-rolls 159 and passes down and along the carrier-chain over the boxes or molds and at the point of discharge over a roller 162. A proper tension is maintained on the ribbon by a weight 163, for which a suitably-arranged spring may be substituted. At a suitable place along the lower travel of the boxes or mold is located a chute 164, provided on its inner end with wings 165, having cam-grooves 166 cut in their inner adjacent faces, as shown in Figs. 20 and 21. In these grooves are supported the ends of a bar 167, having upwardly-projecting fingers 168, arranged during their forward movement to force the cake from the box or mold into the chute 164. A pitman 169 connects the bar 167 with a crank-arm 170 on the end of the counter-shaft 171, which is mounted in suitable bearings 172, secured to the frame of the machine, and has a beveled pinion 173 keyed thereon, said pinion intermeshing with a corresponding pinion 174 in the main shaft 76. As the bar 167 is moved to the left in Fig. 20, its ends traverse the upper horizontal portions of the cam-grooves 166 until the cake has been discharged. They then pass down the front inclined grooves, entering the lower horizontal portions of said grooves, until near the rearward limit of their movements, when they pass up the rear inclined grooves into the upper horizontal portions. The ends of the bar are prevented from entering the rear inclined grooves during their forward movement and the front inclined grooves during their backward movement by spring-fingers 175, as shown in Fig. 20.

It will be observed that all the mechanisms hereinbefore described, except the vertically-moving cross-head, the sprocket-wheels, and the discharge mechanism, are operated by the transmitting-bar 74 through the medium of reciprocating bars, each provided with cams for operating such mechanisms in due sequence. As shown in Figs. 2, 3, 4, and 5, the bars A, which are supported in suitable slide-ways 176, are provided at their outer ends with upward extensions, having eyes formed thereon for the reception of the transmitting-bar 74. The bar C, provided with a cam-like projection for operating the shearing mechanism, is adjustably attached to the bars A. The bars B B', connected to the transmitting-bar 74, have attached thereto the cam-like projections or plates with cam-grooves, whereby all the mechanisms directly operative in effecting the several folds are operated—as, for example, the mechanisms for turning down the ends $d$ $d'$ of the wrapper are operated by the cam projection $93^d$ on the bar B and by the cam-grooves $98^d$, formed in the bar B'. The mechanism for tucking in the portions $e$ of the wrapper is operated by the angular toe $114^e$ on the bar E, which is adjustably attached to the bar B', while the mechanisms for turning in the portions $f$ of the wrapper are operated by cam-grooves in the plates F, adjustably attached to the bars B B'. The turning in of the portions $g$ is effected by a stationary roller during the onward movement of the boxes or molds. The mechanisms for applying the paste and turning up of the portions $h$ are operated by an angular toe $157^h$ on the bar H' and a cam projection on the bar H, the latter adjustably attached to the bar B and the former formed integral with or secured to the bar H. The standards carrying the bars C, E, H, and H' and the plates F are provided at their lower ends with eyes or loops fitting around the bars A, B, and B', respectively, and held in position longitudinally of said bars by set-screws.

It will be observed that the several above-described operations are effected nearly simultaneously on different packages, and that said operations, except the turning in of the portions $g$ of the wrapper, are effected during the rearward movements of the transmitting-bar and its connections, and that the several mechanisms are at rest during the return movements of the several cam-bars, at which time the boxes or molds are shifted.

A number of the operations involved in wrapping packages have been described as effected by means of rolls or rollers; but it will be readily understood by those skilled in the art that these rolls or rollers are merely anti-friction devices employed to avoid tearing the wrapper, and that fingers or bars could be employed, the anti-friction rolls being dispensed with; and it will be readily understood by those skilled in the art that the mechanisms employed in effecting the movements of the parts directly operative in folding the wrapper can be modified and changed in many ways without departing from the invention.

I claim herein as my invention—

1. In a machine for wrapping packages, the combination of intermittingly-moving box or mold, mechanism, substantially as described, for feeding the wrapper in front of said box or mold, a plunger for forcing the body to be wrapped and the wrapper into the mold or box, thereby folding the wrapper around three sides of said body, reciprocating devices for folding down the free ends of the wrapper, substantially as described, tuckers movable downwardly and inwardly for folding in the sides of the previously-formed case or shell, a reciprocating device, and a stationary device, substantially as described, for folding in two opposite sides of the wrapper, the stationary device operating during the onward movement of the box or mold, and vertically-movable arms for turning up the triangularly-shaped portions against the previously-folded portions, substantially as set forth.

2. In a machine for applying a double wrapper to packages, jaws movable with reference to each other and vertically, one of said jaws being provided with a slot for free passage of one of the wrappers, the other wrapper being grasped and slightly raised by the upward movement of the jaws, in combination with a box or mold, a reciprocating plunger, and mechanism for feeding both wrappers between the box and plunger, substantially as set forth.

3. In a machine for wrapping packages, the combination of a box or mold, a reciprocating plunger, a reciprocating head operative between the mold and plunger, grippers for grasping the paper during the upward movement of the head, mechanism for opening the grippers at the upper limit of their movement and permitting them to close at the lower limit, normally-open supporting-grippers, and means for closing said grippers at the upper limit of their movement, substantially as set forth.

4. In a machine for wrapping packages, the combination of a box or mold, a reciprocating plunger, mechanism for feeding the paper between the mold and plunger at proper intervals, and a pair of independent shearing-blades, both having a forward and angular movement, substantially as described.

5. In a machine for wrapping packages, the combination of two or more intermittingly-moving boxes or molds, a chute for feeding the body to be wrapped in front of the boxes or molds at one point in their movement, a reciprocating head provided with grippers for drawing the paper between the box or mold and said body from a roll thereof, shearing-blades for dividing the paper, and a reciprocating plunger for forcing the body into the box or mold, substantially as set forth.

6. In a machine for wrapping packages, the combination of a series of two or more intermittingly-moving boxes or molds open at their tops and ends and provided with yielding and adjustable presser-plates, a bed for the reception of the body to be wrapped, mechanism, substantially as described, for feeding the paper between said body and the mold or box, and a plunger for forcing said body and wrapper into the box or mold, substantially as set forth.

7. In a machine for wrapping packages, the combination of a pair of rolls movable in sequence toward each other, and a series of two or more boxes or molds having an intermittent movement under the rolls, substantially as set forth.

8. In a machine for wrapping packages, the combination of a pair of rolls movable in sequence toward each other, a retaining-plate, and a box or mold movable under the rolls and to and under the retaining-plate, substantially as set forth.

9. In a machine for wrapping packages, the combination of a box or mold and tucking-blades, each blade movable simultaneously downward and inward, whereby the wrapper is pressed around the ends of the body with a wiping or smoothing movement, substantially as set forth.

10. In a machine for wrapping packages, the combination of a box or mold, tucking-blades pivoted on a movable support, a spring for moving the lower ends of the blades outwardly, cam projections for moving the lower ends inwardly against the action of the spring, and mechanism for moving the blades vertically, substantially as set forth.

11. In a machine for wrapping packages, the combination of a box or mold and a pair of rolls movable vertically and horizontally for folding in the portions $f$ of the wrapper, substantially as set forth.

12. In a machine for wrapping packages, the combination of a box or mold, tucking-blades having a downward and inward movement, horizontally-reciprocating rolls, and mechanism for operating the blades and rolls in proper sequence, substantially as set forth.

13. In a machine for wrapping packages, the combination of a movable box or mold, blades for retaining the previously tucked and folded portions of the wrapper in position, and stationary rolls for folding the portions $g$ of the wrapper, substantially as set forth.

14. In a machine for wrapping packages, the combination of a movable box or mold, side plates for retaining the previously-folded portions in position, beveled ledges formed along the edges of the bed-plate, and stationary rolls arranged above the beveled edges, substantially as set forth.

15. In a machine for wrapping packages, the combination of a movable box or mold, side plates for retaining the previously-folded portions in position, the side plates being so arranged relative to the bed-plate as to form a gradually-contracted slot 138, whereby the folds adjacent to the ends of the package are compacted, substantially as set forth.

16. In a machine for wrapping packages, the combination of a box or mold, and vertically-movable arms having forked ends, said forks adapted to pass above and below the triangularly-shaped portions $h$ of the wrapper and fold the same against the ends of the package, substantially as set forth.

17. In a machine for wrapping packages, the combination of a box or mold, vertically-movable arms having forked ends, said forks adapted to pass above and below the triangularly-shaped portions $h$, and a movable paste-applying device, substantially as set forth.

18. In a machine for wrapping packages, the combination of a movable box or mold, and a series of vertical ironing or pressing rolls arranged to press and hold the triangularly-shaped portions $h$ against the ends of the package, substantially as set forth.

19. In a machine for wrapping packages, the combination of a traversing sprocket-chain, a series of open-top molds or boxes attached thereto, mechanisms for placing the articles to be wrapped into said boxes and molds and applying the wrapper thereto, substantially in the manner described, and a band or ribbon for holding the packages in the molds until they reach the point of discharge, substantially as set forth.

20. In a machine for wrapping packages, the combination of a series of two or more open-ended boxes or molds having an intermittent movement and provided with spring side plates, whereby the package is yieldingly held within the boxes or molds, and a reciprocating finger for pushing the finished package through one of the open ends of said boxes at one point of their movement, substantially as set forth.

21. In a machine for wrapping packages, the combination of a series of intermittingly-moving boxes or molds, a plunger for forcing the article to be wrapped and the paper into the boxes or molds, rolls movable in sequence toward each other for folding down the free ends of the paper, tuckers movable downwardly and inwardly for tucking in the sides of the shell thus formed, stationary and movable rolls for folding in the portions $f$ and $g$ of the wrapper, vertically-movable arms for turning up the triangularly-shaped portions of the wrapper, and movable cam-surfaces for operating the several parts in proper sequence, substantially as set forth.

In testimony whereof I have hereunto set my hand.

GEORGE F. McCOMBS.

Witnesses:
R. H. WHITTLESEY,
DARWIN S. WOLCOTT.